United States Patent Office 3,344,150
6-SUBSTITUTED 2,3,5-TRIOXO-TETRAHYDROPY-
RANS AND THEIR 3-ENOL ESTERS AND ETHERS
Michael Cais, Ahuza, Haifa, and William Taub, Reho-
voth, Israel, assignors to Technion Research and De-
velopment Foundation Ltd., Haifa, Israel, a corpora-
tion of Israel
No Drawing. Filed Apr. 23, 1963, Ser. No. 274,928
8 Claims. (Cl. 260—343.5)

This invention provides new 6-substituted 2,3,5-trioxo-tetrahydropyrans and their 3-enol esters or ethers of the general formula

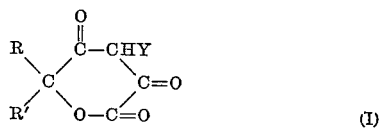

and

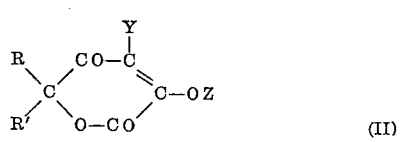

wherein R is taken from the class consisting of hydrogen, alkyl, aralkyl, cycloalkyl and aryl, and first portions of carbocyclic and heterocyclic rings; R' is taken from the class consisting of hydrogen, alkyl, aralkyl and aryl radi-cals, and, when R is one of said first portions, R' is taken from the class consisting of complementary portions of said first portions of said carbocyclic and heterocyclic rings; said rings, together with the tetrahydropyran ring forming a spirocyclic system; Y is taken from the class consisting of hydrogen, halogen, amino group and hydro-carbon radicals; and Z is taken from the class consisting of alkyl, aralkyl and aryl radicals; R and R' together hav-ing at least 4 carbon atoms.

The new substances according to this invention have valuable pharmacological properties, especially an anti-inflammatory effect, which is all the more surprising as the only known representative of this group, i.e. 6-di-methyl-2,3,5-trioxo-tetrahydropyran, is virtually inactive pharmacologically.

The new compounds according to the invention can be prepared in an analogous manner to the preparation of the known 6-dimethyl compound aforesaid in that an α-ketol of the formula

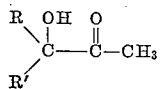

where R and R' have the same meaning as above, is re-acted with an oxalic acid ester whereby the 2,3,5-trioxo compound is formed.

The 3-enol esters are prepared from the corresponding 2,3,5-trioxo compounds in a conventional manner by acylation, and the corresponding enol ethers by reaction with an etherifying reactant, e.g. diazomethane.

A substitutent can be introduced in the 4-position of the 2,3,5-trioxo compound or the corresponding 3-enol ester or ether in a suitable manner. For example, bromine can be thus introduced by direct bromination, and the 4-bromo compound can serve as a starting material for other 4-substituted compounds.

Some new compounds of the formula indicated above, which have been found to be pharmacologically active, are, for example, listed in the following table:

6-methyl-6-isopropyl-2,3,5-trioxo-tetrahydropyran
6-methyl-6-iso-butyl-2,3,5-trioxo-tetrahydropyran
6-methyl-6-tert.butyl 2,3,5-trioxo-tetrahydropyran
6-methyl-6-n-hexyl-2,3,5-trioxo-tetrahydropyran
6-methyl-6-cyclopropyl-2,3,5-trioxo-tetrahydropyran
6-methyl-6-cyclohexyl-2,3,5-trioxo-tetrahydropyran
6-methyl-6-phenyl-2,3,5-trioxo-tetrahydropyran
6-ethyl-6-n-butyl-2,3,5-trioxo-tetrahydropyran
6-ethyl-6-n-butyl-4-bromo-2,3,5-trioxo-tetrahydropyran
6-ethyl-6-phenyl-2,3,5-trioxo-tetrahydropyran
6,6-spiro(cyclohexyl)-2,3,5-trioxo-tetrahydropyran
6,6-spiro(2'-methylcyclohexyl)-2,3,5-trioxo-tetra-
 hydropyran
6-phenyl-2,3,5-trioxo-tetrahydropyran
6-ethyl-6-n-butyl-2,5-dioxo-3-enolacetate-tetrahy-
 dropyran The invention is illustrated by the following examples to which it is not limited.

EXAMPLE 1

6-methyl-6-tert, butyl-2,3,5-trioxo-tetrahydropyran

In a 3-necked flask fitted with stirrer, reflux condenser and dropping-funnel there were placed 6 g. (0.25 mole) of sodium hydride and 100 ml. of dry diethyl ether. To the vigorously stirred mixture, 12 g. (0.25 mole) of ethanol was added dropwise at such a rate as to main-tain gentle reflux. After the addition of all the ethanol in the course of about ½ hour, the mixture was refluxed for another two hours by which time all the sodium hydride and reacted. To the cooled solution, 36.5 g. (0.25 mole) of freshly distilled methyl oxalate was added slowly and the mixture was stirred for another half-hour under cooling (ice-salt bath). At the end of this time, 35 g. (0.25 mole) of methyl-tert.butyl-acetyl carbinol,

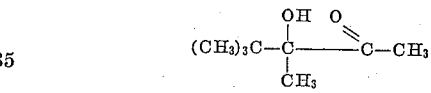

was slowly added to the continuously cooled and stirred reaction mixture; a short time after the beginning of this addition, the solution turned cloudy and a precipitate be-gan to form. After the addition was completed, stirring was continued for another four hours. The reaction mix-ture was then poured into iced-water and the aqueous mixture was extracted twice with ether to remove unre-acted materials. The aqueous layer was acidified with aqueous hydrochloric acid and the white-yellow precipitate formed was filtered to yield about 55 g. Crystallization from benzene yielded white crystals (40 g.) of M.P. 145–146° C.

Analysis.—Calculated for $C_{10}H_{14}O_4$: C, 60.59; H, 7.12. Found: C, 60.99; H, 7.34.

If upon acidification of the aqueous mixture the product is oily and does not crystallize, it is extracted with ether and dried over $Na_2SO_4$, then the ether is evaporated and leaves the residue in crystalline form.

In the examples below the procedure described in Example 1 is followed in an analogous manner and will therefore not be described. Instead, only the reactants and the yield are indicated.

EXAMPLE 2

6-methyl-6-iso-butyl-2,3,5-trioxo-tetrahydropyran

Reactants:
 Sodium hydride _____ 17 g. (0.7 mole)
 Ethanol _____ 37 g. (0.8 mole)
 Diethyl oxalate _____ 102 g. (0.7 mole)
 Iso-butyl-methyl-acetyl
  carbinol _____ 100 g. (0.7 mole)

Yield: 85 g. of crystals of M.P. 79–80° C. After one recrystallization from hexane—M.P. 85–86° C.

Analysis.—Calculated for $C_{10}H_{14}O_4$: C, 60.59; H. 7.12. Found: C, 60.64; H, 7.13.

EXAMPLE 3

*6-methyl-6-cyclohexyl-2,3,5-trioxo-tetrahydropyran*

Reactants:
| | |
|---|---|
| Sodium hydride | 6 g. (0.25 mole) |
| Ethanol | 12 g. (0.26 mole) |
| Diethyl oxalate | 36.5 g. (0.25 mole) |
| Cyclohexyl-methyl-acetyl carbinol | 42.5 g. (0.25 mole) |

Yield: 68 g. of a solid substance which after one crystallization from hexane/benzene yielded crystals of M.P. 124–128° C. A second crystallization raised the M.P. to 129–130° C.

EXAMPLE 4

*6-ethyl-6-phenyl-2,3,5-trioxo-tetrahydropyran*

Reactants:
| | |
|---|---|
| Sodium hydride | 2.4 g. (0.1 mole) |
| Ethanol | 5 g. (0.1 mole) |
| Diethyl oxalate | 14.6 g. (0.1 mole) |
| Phenyl-ethyl-acetyl carbinol | 19.4 g. (0.1 mole) |

Yield: 15 g. of a yellowish solid substance which after recrystallization gave white crystals of M.P. 116–117° C.
*Analysis.*—Calculated for $C_{13}H_{12}O_4$: C, 67.23; H, 5.21. Found: C, 67.17; H, 5.11.

EXAMPLE 5

*6,6-spiro(2'-methylcyclohexyl)-2,3,5-trioxo-tetrahydropyran*

Formula:

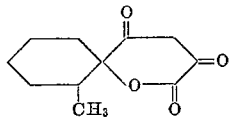

Reactants:
| | |
|---|---|
| Sodium hydride | 6 g. (0.25 mole) |
| Ethanol | 12 g. (0.26 mole) |
| Diethyl oxalate | 36.5 g. (0.25 mole) |
| 1 - acetyl - 2 - methylcyclohexanole-1 | 40 g. (0.25 mole) |

Yield: 25 g. of a crystalline substance which after crystallization from hexane/benzene had the M.P. 133–134° C.
*Analysis.*—Calculated for $C_{11}H_{14}O_4$: C, 62.84; H, 6.71. Found: C, 63.04; H, 6.63.

EXAMPLE 6

*6-phenyl-2,3,5-trioxo-tetrahydropyran*

Reactants:
| | |
|---|---|
| Sodium hydride | 6 g. (0.25 mole) |
| Ethanol | 12 g. (0.26 mole) |
| Diethyl oxalate | 36.5 g. (0.25 mole) |
| Phenyl-acetyl carbinol | 30 g. (0.2 mole) |

Yield: 33 g. of a yellow solid substance. Recrystallization from ethylacetate/benzene yielded an analytical sample of M.P. 257–258° C.
*Analysis.*—Calculated for $C_{11}H_8O_4$: C, 64.71; H, 3.95. Found: C, 64.98; H, 4.06.

EXAMPLE 7

*6-ethyl-6-n-butyl-2,5-dioxo-3-enolacetate-tetrahydropyran*

Formula:

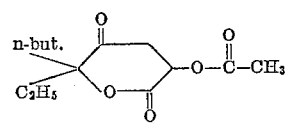

The trioxo compound, 6-ethyl-6-n-butyl-2,3,5-trioxo-tetrahydropyran, was prepared in analogy to Example 1. 20 g. (0.1 mole) of the trioxo compound was dissolved in a mixture of 100 ml. of anhydrous diethyl ether and 12 g. of dry pyridine. To the cooled solution there was added a solution of 12 g. of acetyl chloride in 50 ml. of diethyl ether. The mixture was stirred for three hours with cooling and then for several hours at room temperature. The mixture was then poured into iced water, extracted with ether, the ether extract was dried over $Na_2SO_4$ and after evaporation of the solvent there was obtained 22.5 g. of a yellowish-oily substance. This was distilled in vacuo, B.P. 112–116° C./0.03 mm. Hg.
*Analysis.*—Calculated for $C_{13}H_{18}O_5$: C, 61.40; H, 7.14. Found: C, 61.35; H, 7.18.

EXAMPLE 8

*6-ethyl-6-n-butyl-4-bromo-2,3,5-trioxo-tetrahydropyran*

6-ethyl-6-n-butyl - 2,3,5 - trioxo-tetrahydropyran is prepared in analogy to Example 1.

10 g. (0.05 mole) of this substance was dissolved in 50 ml. of methylene chloride and the substance cooled to 0° C. To the cooled solution of 8 g. (0.05 mole) of bromine in 25 ml. of methylene chloride. After completing the addition (1½ hours) the solvent was removed in vacuo (water pump) without heating. The residue, a viscous oil, was triturated with petroleum ether to yield 10.6 g. of white crystals, M.P. 84–89° C. Recrystallization from petroleum ether/diethyl ether yielded the analytical sample M.P. 91–93° C.
*Analysis.*—Calculated for $C_{11}H_{15}O_4$ Br: C, 45.38; H, 5.19; Br, 37. Found: C, 45.56; H, 5.19; Br, 27.

We claim:
1. A compound selected from the class consisting of 6-substituted-2,3,5-trioxotetrahydropyrans and their 3-enol esters and ethers of the formulae

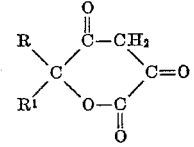

and

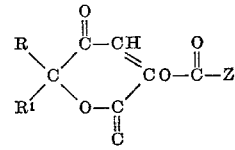

wherein
R represents a member selected from the class consisting of hydrogen and lower alkyl;
$R^1$ represents a member selected from the class consisting of cycloalkyl having up to about 6 carbon atoms and, when the compound is in the enolester form, lower alkyl;
R and $R^1$ together represents a 6 carbon atom spirocycloalkyl; and
Z represents lower alkyl.

2. 6-methyl-6-cyclopropyl-2,3,5-trioxotetrahydropyran.
3. 6-methyl-6-cyclohexyl-2,3,5-trioxotetrahydropyran.
4. 6,6-spiro(cyclohexyl)-2,3,5-trioxotetrahydropyran.
5. 6,6-spiro(2'-methylcyclohexyl)-2,3,5 - trioxotetrahydropyran.
6. 6-ethyl-6-n-butyl-2,5-dioxo-3-enol-acetate-tetrahydropyran.
7. A process for the preparation of compounds taken from the class consisting of 3-enol esters and ethers of 6-substituted 2,3,5-trioxo-tetrahydropyran wherein said tetrahydropyran is reacted with a compound taken from the class consisting of acylating agents and etherifying agents.

8. A process according to claim 7 wherein said acylating agent is acetyl chloride and said etherifying agent is diazomethane.

References Cited

Diels et al., Berichte (1911), pages 408–409.

Wagner et al., Synthetic Organic Chemistry (1953), page 481.

ALEX MAZEL, *Primary Examiner.*

J. NARCAVAGE, *Assistant Examiner.*